United States Patent
Lilienthal

(10) Patent No.: US 6,933,928 B1
(45) Date of Patent: Aug. 23, 2005

(54) ELECTRONIC BOOK PLAYER WITH AUDIO SYNCHRONIZATION

(76) Inventor: Scott E. Lilienthal, 405 Fourth St., Laurel, MD (US) 20707

(*) Notice: Subject to any disclaimer, the term of this patent is extended or adjusted under 35 U.S.C. 154(b) by 735 days.

(21) Appl. No.: 09/618,924

(22) Filed: Jul. 18, 2000

(51) Int. Cl.$^7$ ................................................. G09G 5/00
(52) U.S. Cl. .................... 345/173; 345/156; 345/776; 345/854; 345/860; 345/864; 345/901; 434/308; 434/309; 434/311; 434/317
(58) Field of Search ........................ 345/156, 173, 345/776, 854, 860, 864, 901; 434/308, 309, 311, 317

(56) References Cited

U.S. PATENT DOCUMENTS

| | | | | |
|---|---|---|---|---|
| 4,159,417 A | | 6/1979 | Rubincam | 235/375 |
| 4,820,167 A | * | 4/1989 | Nobles et al. | 434/307 R |
| 4,985,697 A | * | 1/1991 | Boulton | 707/500.1 |
| 4,997,374 A | * | 3/1991 | Simone | 434/317 |
| D326,446 S | * | 5/1992 | Wong | D14/100 |
| 5,167,508 A | | 12/1992 | McTaggart | 434/317 |
| 5,239,665 A | * | 8/1993 | Tsuchiya | 345/776 |
| 5,339,091 A | | 8/1994 | Yamazaki et al. | 345/104 |
| 5,417,575 A | | 5/1995 | McTaggart | 434/317 |
| 5,495,557 A | * | 2/1996 | Hyman et al. | 704/270 |
| 5,631,883 A | * | 5/1997 | Li | 369/64 |
| 5,761,485 A | * | 6/1998 | Munyan | 345/839 |
| 5,802,515 A | | 9/1998 | Shwarts | 707/6 |
| 5,847,698 A | * | 12/1998 | Reavey et al. | 345/173 |
| 5,893,132 A | * | 4/1999 | Huffman et al. | 434/167 |
| 6,021,306 A | * | 2/2000 | McTaggart | 434/308 |
| 6,243,071 B1 | * | 6/2001 | Shwarts et al. | 345/776 |
| 6,297,812 B1 | * | 10/2001 | Ohara et al. | 345/173 |
| 6,331,867 B1 | * | 12/2001 | Eberhard et al. | 345/824 |
| 6,380,923 B1 | * | 4/2002 | Fukumoto et al. | 341/22 |
| 6,384,808 B2 | * | 5/2002 | Azami | 345/100 |
| 6,694,200 B1 | * | 2/2004 | Naim | 700/94 |

OTHER PUBLICATIONS

Jay Greene E–books' Brass Band, Business Week, Apr. 3, 2000, pp. EB 46–EB 50.

* cited by examiner

Primary Examiner—Bipin Shalwala
Assistant Examiner—Vincent E. Kovalick
(74) Attorney, Agent, or Firm—William S. Ramsey

(57) ABSTRACT

This paperless book is portable and uses removable ROM devices to provide the visual and aural information displayed in the paperless book. The book can be read in a visual mode, as print, or in an aural mode, as the spoken word corresponding to the print, or in both visual and aural modes. The display mode may be conveniently shifted back and forth between visual and aural, for use, for example, by a counter who uses the book in the aural mode while driving and switches to the visual mode while riding on a train. In addition, the visual display may be manipulated affecting the appearance, for use, for example, by persons with reduced visual acuity. Movies also may be viewed using the paperless book. Finally, portions of the text may be enhanced by additional visual images, music or other sounds.

6 Claims, 4 Drawing Sheets

ELECTRONIC BOOK PLAYER WITH AUDIO SYNCHRONIZATION

CROSS REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates to portable paperless books.

2. Description of Related Art Including Information Disclosed Under 37 CFR 1. 97 and 1. 98.

Printed paper is the traditional medium for books. Other than minor changes in paper, binding, and ink technologies, the form of books has not changed significantly in centuries. This is changing as electronics and computers are altering the nature, authoring, publishing, cost, and form of books.

Electronics are being incorporated into all aspects of society and especially in the field of communications. With the introduction of the computer and the internet into everyday life, the written word, including the book, is one of the primary technologies impacted by this revolution. Book technology is changing in several directions.

The printed word in books, magazines, and newspapers has expanded from paper editions to audio versions and electronic versions. Audio books provide an aural rendition of the words in the book and use a cassette tape or digital electronic disk as a medium for the information and require an electronic apparatus for the expression of the information.

Audio books have found limited popularity among reading-disabled persons and travelers. An audio book may include enhancements such as celebrities reading the book, appropriate multiple voices for the various characters in the story, and other audible enhancements such as music and sound effects which add to the enjoyment of the book. The overwhelming preference for the visual book, however, limits the popularity of the audio book.

The electronic book has taken two forms. The first form is the paper book with electronic sensors built into the pages which activate a audio component. The technology enhances the reading experience. A book of this form, however, is expensive to manufacture, in part because the electronic components are dedicated to a single title.

The second form of electronic book does not use paper, but instead uses an electronic display to present electronic text. Such books appear in a variety of configurations.

U.S. Pat. No. 4,159,417 discloses a portable, electronic viewer which reads stored miniaturized information and displays the information on a thin electronic screen. Although a variety of digital storage media is disclosed, the preferred embodiment used a hologram. The viewer was constructed with two facing electronic screen "sheets" and resembled a book in that sense.

U.S. Pat. No. 5,167,508 discloses an electronic book with multiple leaves each of which are multilayered with a sheet with printed material mounted against a sheet with diodes.

The diodes are sequentially lighted, thereby sequentially illuminating portions of the book, and an audible discussion of the printed materials provided by a voice synthesizer in sequence with the illumination.

U.S. Pat. No. 5,239,665 discloses an electronic book which retrieves information from memory media such as floppy disks or laser cards. In addition, the information may be received by telephonic or wireless means. This book allows the reader to adjust the reading speed to that used in reading books, magazines or newspapers.

U.S. Pat. No. 5,339,091 discloses a visual only electronic book with a single visual display unit which displays information from floppy disks. The book is powered by a battery or solar cell.

U.S. Pat. No. 5,417,575 discloses an electronic book with multiple pages formed from a single folded sheet of circuitry. Printed images laminated on the pages are illuminated sequentially and synchronized audible signals provide enhancing information, for example, informing the reader of alternative progressing choices, such as touching or pressing a portion of an image on the page in order to enter a game.

U.S. Pat. No. 5,631,883 discloses a ordinary book of printed texts in conjunction with an audio device with a ROM which audibly reads portions of the book corresponding to the opened pages. Information on which pages are open is provided by reflective tabs on the margin of each page.

U.S. Pat. No. 5,761,485 discloses a personal electronic book with facing pages each with several icons which, when touched, calls up the appropriate cover page for a printed product or for a video or audio clip. The book is linked via a cellular telephone to a network which provides content.

U.S. Pat. No. 5,802,516 discloses a touchscreen method of controlling the screen display of an electronic book using an electronic pen or stylus for navigating the table of contents.

None of these prior art devices achieve the goals of the present invention, that is, of providing a portable paperless book in which the visual and audible displays proceed in synchrony and the user can experience the audible or the visible or both at the same time.

BRIEF SUMMARY OF THE INVENTION

The portable paperless book of this invention includes a digital storage device for visual and audible information and a display system for displaying visual and audible information from the storage device wherein the visual and audible information is displayed with the visual and audible information In synchrony.

Book technology is poised to evolve to a new level with the advent of computer, compact electronic data storage technologies, and miniature display technologies. Books on tape are a major innovation which enables hands- and eyes-free reading of a book. Electronic books are a visual and multimedia means of displaying book material either in a physical paper book or through a paperless book which displays type using an electronic display. Both books on tape and electronic book technologies have their own strengths and weaknesses. This invention fuses the advantages of these two book technologies to create an innovation which overcomes the weaknesses of each. This is the first major innovation in general book technology since Gutenberg.

Prior art electronic versions of books attempt to mimic paper books. Electronic books either incorporate electronic features into page-based books for enhanced reading, or have electronic viewers which manipulate text and multimedia data for display electronically. Until now, electronic books have had marginal benefits for the reader over traditional book technology such as standard print on paper books and books on tape. The paperless book of the present invention focuses on function rather than on form in order to use the power of the digital age to create a more useful book product.

People read books under a variety of different conditions, such as reading at work, while in bed, and while commuting or otherwise traveling. Visually impaired people often prefer to read books on tape or books with large-size type over reading books written in Braille. Books in Braille are often expensive and limited in selection, and it is difficult to learn to read books in Braille. An uninterrupted period of time for book reading is a rare luxury for many people today. People tend to read at opportunities during their busy days. For example, a person may have a book on tape to which he or she listens while driving to a commuter train. While on the train, this busy commuter may read a book. People are forced to use one type of book media even through their reading conditions vary during any given day. Until the advent of the present invention, there was no product that adapts the media to a person's changing conditions and preferences.

The present invention will enable persons such as commuters to read books under constantly changing conditions. In addition, this invention is especially useful in enabling visually-impaired persons access to books.

This paperless book comprises a high-density portable memory device player which uses encoded data (on a ROM) which contains the complete written text and spoken audio text of a book so the book can be read or comprehended under all conditions. The term "ROM" means removable high-density memory media such as floppy disks, CD-ROM disks, DVD disks and any other similar media to be developed in the further.

A given book may be encompassed by a single ROM or may require multiple ROMs. For a standard book comprising several hours of digital or analog audio, a gigabyte of storage may be required. This amount of storage capacity depends on the sound quality and other factors, such as the presence or absence of visual illustrations. This invention is completely portable and in this sense is comparable to a paperback book or portable CD player.

This paperless book is closely indexed between visual text and audible text, so that the user can choose to experience the visual or audio versions, or both at the same time. There is automatic updating or scrolling so that the visual text automatically advances as the audio text is finished. The user had complete control of the progression of the reading and can at any point halt the reading or go back or forward to any point in the book.

The visual display may be modified in terms of font and font size and lighting brightness. This is especially usefull for persons with limited visual capabilities.

The displays are multiple; the visual displays include a display on the top of the book and a head-mounted display. The audible display includes speakers on the paperless book, and headphones for the use of the reader.

An objective of this invention is to provide a paperless book in which the text can be read as a conventional book.

Another objective of this invention is to provide a paperless book in which the text can be read as an audio book.

Another objective of this invention is to provide a paperless book with immediate and seamless switching between visual and audible reading.

Another objective of this invention is to provide a paperless book in which the visual and audio versions are displayed simultaneously.

Another objective of this invention is to provide a paperless book in which navigation through the entire book is simple and rapid.

Another objective of this invention is to assist vision-restricted persons in reading books by providing a spoken version and by providing enlarged fonts.

Another objective of this invention is to provide a paperless book which can be used to display any multimedia product.

Another objective of this invention is to facilitate the learning of a foreign language by presenting simultaneously the written and spoken versions of the foreign language.

A final objective of this invention is to provide a paperless book which is inexpensive and easy to manufacture using established methods and is without adverse effect on the environment.

DETAILED DESCRIPTION OF THE INVENTION

In this application, the term "paperless book" or "electronic book" means books, magazines, newspapers, brochures, or other compilations of printed words and images which are visually displayed using an electronic device.

The term "audio book" means books, magazines, newspapers, brochures, or other compilations of printed words and images which are audibly displayed using an electronic device which provides the sounds of words, verbal descriptions of images, or music. The term "display" refers to the production of visual images or of sounds. The term "connector" means a wire, bus, SCSI, printed circuit or other device for making electrical connection between two components. The term "ROM" means removable high-density memory media such as floppy disks, CD-ROM disks, DVD disks and any other similar media to be developed in the future.

Figure 1:
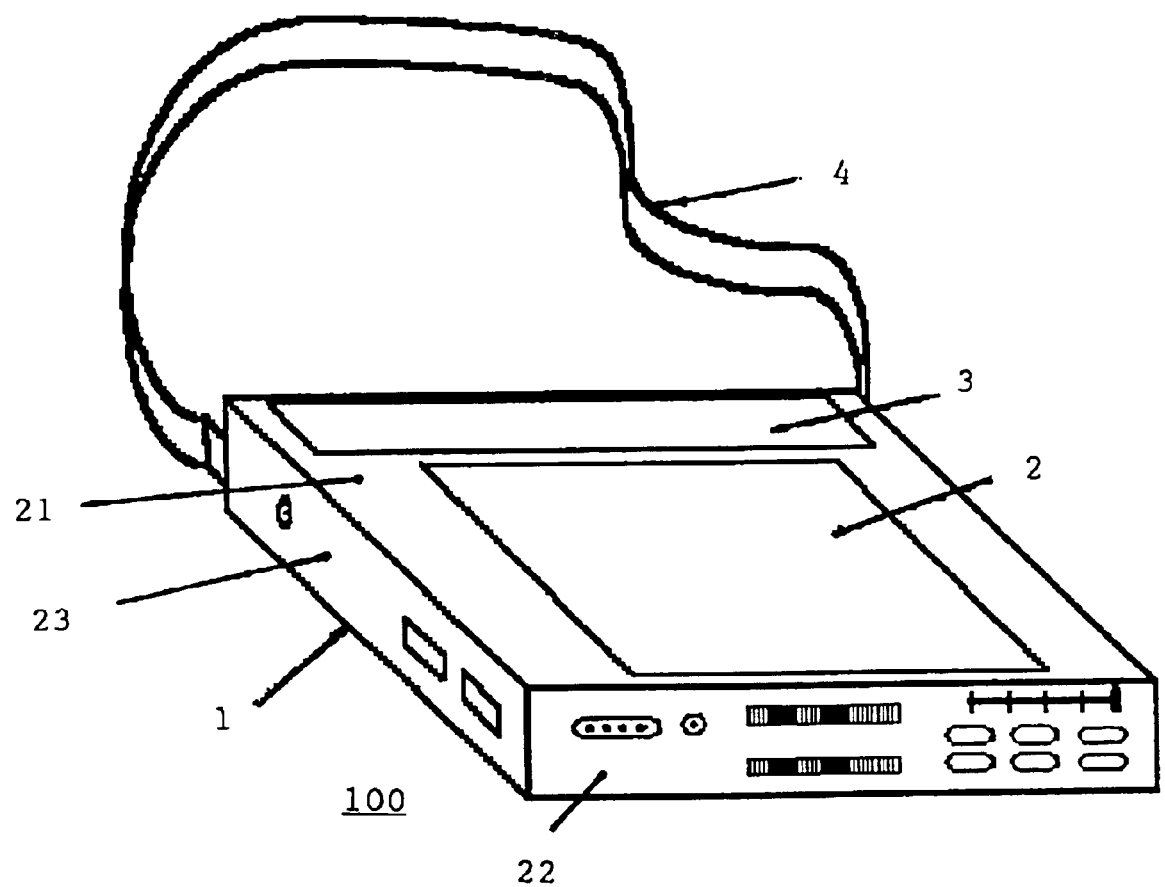
FIG. 1 is a perspective view of the top of the paperless book.

FIG. 1 shows the top 21, front 22, and left 23 panels of the housing 1 of the paperless book 100. An electronic visual display 2 is mounted on the top 21 of the housing and the display has the approximate size of a small to medium sized book. The visual display is a full-sized 600×800 video display. A battery compartment cover 3 is adjacent to the electronic display 2. A carrying strap 4 is used to carry the paperless book.

Figure 2:
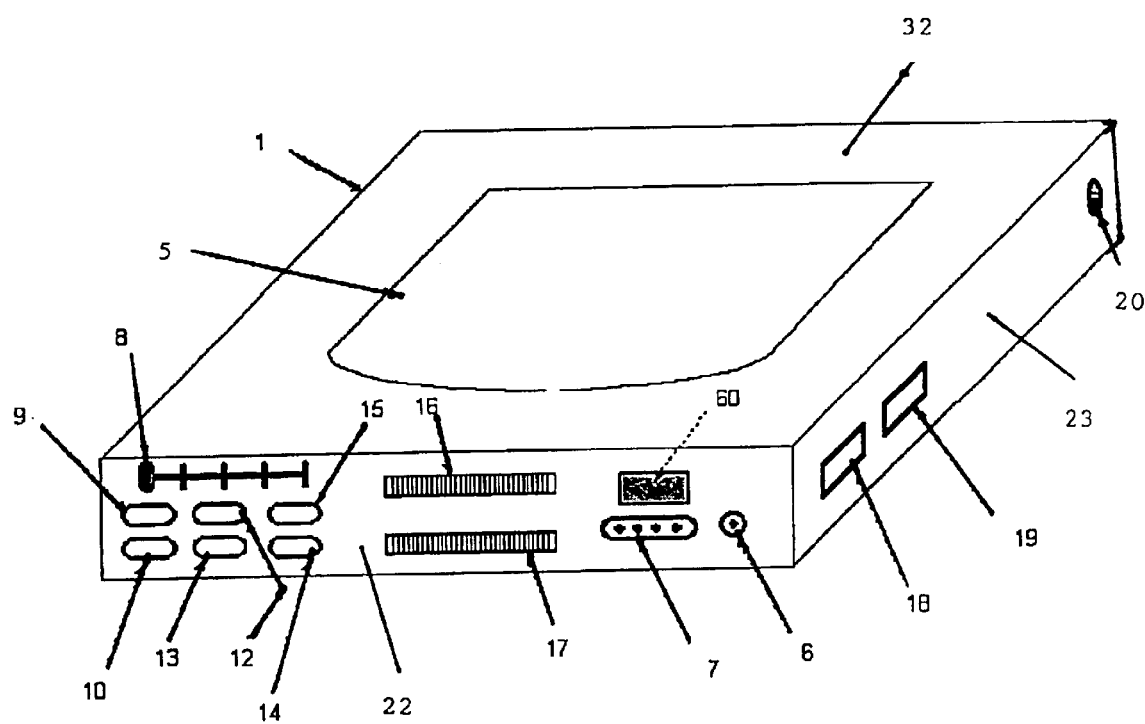
FIG. 2 is a perspective view of the bottom of the paperless book.

FIG. 2 shows the bottom 32, front 22, and left 23 panels of the paperless book. A hinged cover 5 allows access to the interior of the book and is used to insert the removable digital storage devices or ROM. The headphone and remote video display devices are connected to the book through the audio jack 6 and remote video jack 7. Various control switches are located on the front 22 and left 23 panels of the housing 1. The power selector switch 8 controls the mode of use for the book, and is used to select display modes consisting of visual text display with automatic page turning, visual text display with manual page tuning, audio display, hybrid audio and text display, and music CD display. These various modes of operation are termed "off", "text", "hybrid" and "audio" modes, respectively. The play button 9 turns the book on and off and, when on, serves as a manual page turning button.

The stop/pause button 10 disengages and stops play when the book is in the hybrid or music mode. When the book is in the music mode, this button pauses the music when pressed, and if pressed a second time, causes the music to restart at the beginning of the CD. In the hybrid mode, pressing the stop/pause button 10 causes the displays to stop. When the button 10 is pressed a second time, the visual and audible displays resume operation at the point when stopped. This feature is referred to as a "bookmark".

The buttons 9, 10, and 12–15 serve to enable one to change position within the book depending upon what mode one has selected using power selector switch 8. Table 1 shows the actions of the buttons in the various modes.

TABLE 1

| Button Number | Text | Mode Hybrid | Audio |
|---|---|---|---|
| 9 | Advance page | Advance audio or text | Start audio |
| 10 | Reverse audio or text to start of previous chapter | Reverse audio or text to start of previous chapter | Reverse audio or text to start of previous chapter |
| 12 | Bookmark | Bookmark | Bookmark |
| 13 | Reverse page to previous page | Reverse audio or text by 10-second interval per second | Reverse audio by 10-second interval per second |
| 14 | Not applicable | Advance audio or text by 10-second interval per second | Advance audio by 10-second interval per second |
| 15 | Advance page to next chapter | Advance audio or text to next chapter | Advance audio to next chapter |

When button 12 is pressed in the hybrid or audio mode, the progress of play is halted. If the advance button 14 is then depressed, play continues at the point left off. In any mode, when button 12 is depressed, a menu for storage and retrieval of book marked pages appears in text and hybrid modes. A "bookmark" is an electronic analog of the place holder in a book. In the text or hybrid mode, the menu visible on screen is selectable to enable the user to add, retrieve, or delete one or more bookmarks. In the audio mode, an aural signal will enable the user to add, retrieve, or delete bookmarks. The last page read is automatically stored as a bookmark and if the device is turned off and back on, the device will seek this bookmark. If no bookmark is found, the device will reset at the beginning of the book. Buttons 12–15 serve to move the text forward and backward at varying paces in the text, hybrid, and music modes. The fast forward button advances the book one page when pressed, and advances the book to the next chapter when pressed two times in rapid succession.

Table 1 describes button function for the three modes, Text, Hybrid, and Audio. In the three modes button function is roughly analogous. Depressing buttons 10 or 15 causes the user to reverse or advance to the next major index point of the book respectively (e. g., a chapter transition). Buttons 13 and 14 reverse or advance the progress of play by small time increments of 10 seconds for every second the button is depressed. These buttons enable rapid navigation through the electronic book.

The volume level control dial 16 and brightness level control dial 17 control the levels of output to the paperless book visual display or loudspeakers and to the head-wearable visual display and headphones. The mouse-like scroll button 18 brings up a visual display menu that enables the performance of adjustments to the displays and to access specialized data on the display device. It allows access to options controlling font size, contrast in the display, word find, dictionary, and embedded images and video. The select button 19 selects the particular option highlighted using the scroll button. A reverse button sends the display back one page when depressed. When depressed twice in rapid succession the reverse button sends the test back to the previous chapter.

Batteries located in the battery compartment under the battery compartment cover 3 in FIG. 1 power the paperless book. An alternative source of power is provided by an AC to DC converter which is powered by line current and is connected to the paperless book by a wire and a DC jack 20 in FIG. 2.

Figure 3:
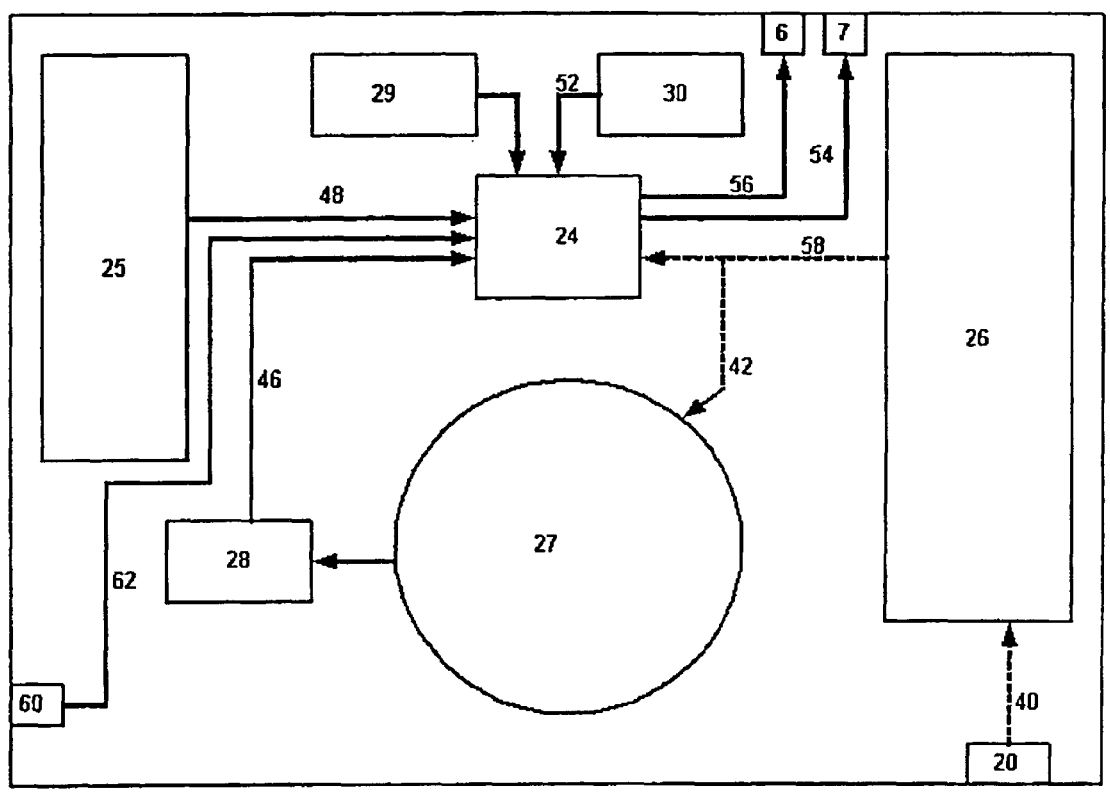
FIG. 3 is a schematic diagram of the components of the paperless book.

FIG. 3 is a schematic of the internal components of the paperless book located inside the housing 1 in FIG. 1. The batteries 26 power the paperless book. An alternative power source, DC current from an AC to DC convertor, is delivered to the paperless book via a power port 20 which is connected to the batteries 26 by connector 40.

The batteries 26 are connected by connector 58 to a central processing unit (CPU) 24. A preferred CPU is a 266 MHz Mobile Pentium II Processor obtained from Intel Corporation of Dupont, Washington. The batteries 26 are also connected by connector 42 to the removable storage medium 27. A preferred removable storage medium device is a Mini DVD obtained from Archos SA of d'Igny, France.

The removable storage medium device 27 is accessed by a memory reader, such as a laser 28, which is connected by connector 44 to the removable storage medium device 27. The laser 28 is connected by connector 46 to the CPU 24. The interface controls 25 include the controls depicted in FIGS. 1 and 2, and are connected by connector 48 to the CPU. A permanent memory 29 contains data permanently associated with the paperless book, as opposed to memory associated with the removable storage medium device 27. A preferred permanent memory is a Serial EEPROM X24C08 obtained from Xicor, Inc. of Milpitas, Calif.

Alternatively, input jack 60 is used to download visual and audio information from a computer or a global computer network. Connector 62 connects input jack 60 with CPU 24.

A temporary memory 30 is connected to the CPU by connector 52. The temporary memory is used to store specific data from one or more books previously read so that, for example, the last few pages read may be retrieved.

Audio and visual outputs from the CPU 24 are sent to the paperless book audio display loudspeakers and audio display screen, not shown in FIG. 4. Loudspeakers are permanently or detachably attached to the housing. Output to the headphones is via audio jack 6 connected to CPU 24 by connector 56. A preferred headphone is a KTX4 obtained from KUSS Corp. of Milwaukee, Wis.

Output to the head-wearable visual display is via visual jack 7 connected to CPU 24 by connector 54. A preferred head-wearable visual display is a Eglass obtained from Virtual Vision of Redmond, Wash.

The audio output jack 6 is also used to connect the paperless book to an automobile stereo system or to a cassette tape player adapter for audio recording. A preferred adapter is a Maxwell model CD-330CD, obtainable from Maxwell Corporation of America, San Jose, Calif.

Figure 4A:
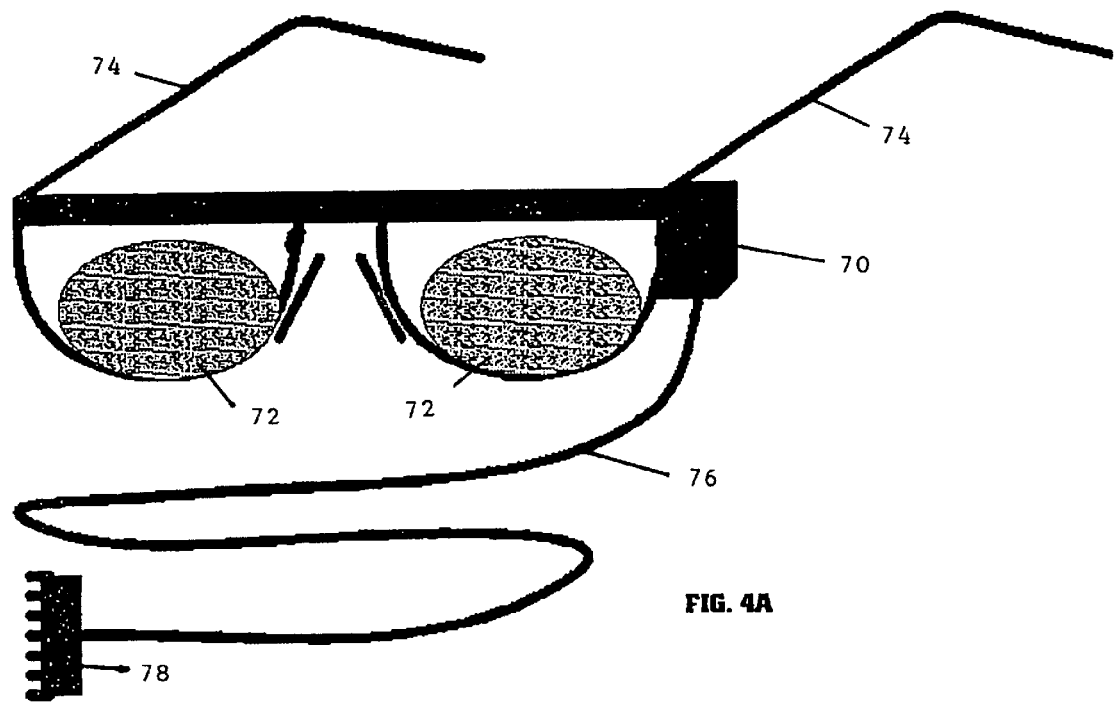
FIG. 4A is a view of the head-wearable visual display.

FIG. 4A is a schematic depiction of a head-wearable visual display 70. Any suitable visual display 72 which provides an image visible in the daylight or nighttime may be used. In particular, the visual display may be a ferroelectric display, electroluminescent display, liquid crystal display, or light emitting diode display. The head-wearable visual display 70 is retained in place by ear pieces 74. A connector 76 and plug 78 is used to connect the visual display 70 with the paperless book 100 in FIG. 1 at the video jack 7 in FIG. 2.

Figure 4B:
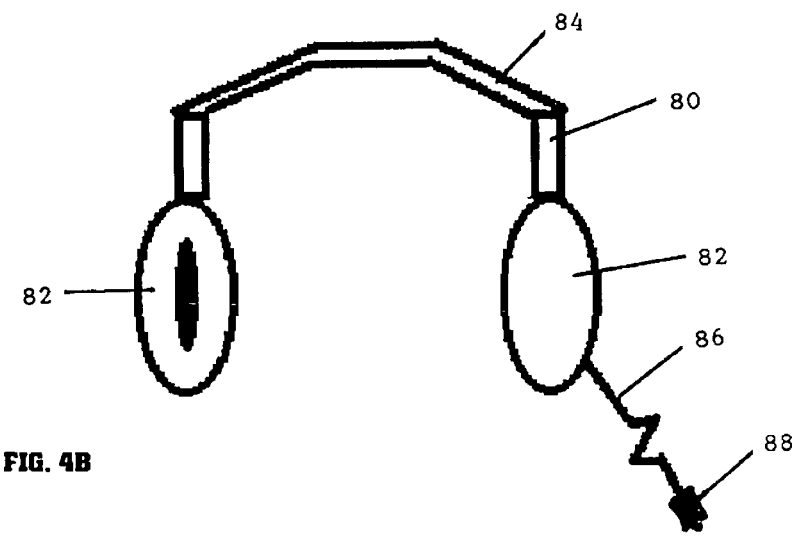
FIG. 4B is a view of the headphones.

At FIG. 4B is a schematic depiction of headphones 80. Any suitable headphones 80 comprising one or more ear pieces 82 and a headpiece 84 may be used. A connector 86 and a plug 88 connect the headphones 80 with the paperless book 100 in FIG. 1 at the audible jack 6 in FIG. 2.

In operation, the paperless book can be read as simply as a book. The visual display of text can be perceived either on the paperless book or on the head-wearable visual display, and the image may be instantaneously switched from one display to another. The text may be scrolled manually as the text is read, or, alternatively, the book may be set to automatically scroll the text to the next page after a certain reading time has past. The duration of the reading time may be adjusted by the reader.

The audible display uses a voice recording or synthetic speech to display the text audibly simultaneously with the visual display. Again, the audible display may be instantaneously switched from the paperless book to the headphones. No matter what mode in which the visual text is read, the audible display keeps pace. In this way the paperless book may be read under the variety of circumstances of modern life.

Additional enhancements to both the visual and audible displays are available. For example, a footnote or an image may accompany a portion of the text. The enhancement is portrayed on the visual text in response to a visual indicator of enhancements, such as a line of highlighted text. There are similar audible enhancements, such as music, at appropriate positions in the audible text.

While this invention is termed a paperless book, it in fact is able to access any sort of digital information, such as recorded music on a CD, or a movie on a DVD, or M3 recordings obtained from networks. Indeed, the information from a ROM may be uploaded to a personal computer using this paperless book.

It will be apparent to those skilled in the art that the examples given here are illustrative only, and that this invention is limited only by the appended claims.

I claim:

1. The process of displaying information in a portable paperless book comprising a visual display system, an audible display system, a digital storage system for visual and audible information, a temporary storage site, and a power system containing a battery for powering the portable paperless book, wherein the visual information is a printed book with words electronically displayed on the visual display for reading and may be electronically erased from the visual display after the words are read, controls for the erasure of the visual display after the words are read, and the audible information is electronically synthesized words of the printed book which are synthesized in synchrony with the words electronically displayed on the visual display, wherein the visible information may be read under constantly changing conditions when the conditions favor visible reading, and the audible information may be listened to under constantly changing conditions when the conditions favor listening to audible information comprising the steps:

a. downloading visual and audible information from a digital storage device into the temporary storage site.

b. displaying a page of printed words from the temporary storage site on a visual display, and c. displaying audible expression of the words of the page of printed words from the temporary storage site on an audible display, the display of audible material simultaneously with the display of words of the page of printed words.

2. The process of claim 1 wherein the visual and audible information is downloaded from a removable memory storage device.

3. The process of claim 1 further comprising the step:

d. advancing the visual display to the next page when the audible display corresponding to the displayed page is completed.

4. A paperless book comprising:

a housing, a central processing unit, ROM reader, permanent memory unit, and temporary memory unit mounted within the housing, a visual display, power jack, head-mounted visual display housing jack, audible display housing jack, scroll button, select button, play button, stop or pause button, directional control buttons, volume control dial, brightness control dial, door for inserting ROM, and shoulder strap, mounted on the housing, earphones, connecting wires, and an earphone jack, the earphone jack connected to the audible display housing jack, a head-mounted visual display, connecting wire, and visual display jack, the visual display jack connected to the head-mounted visual display housing jack, and a battery for powering the paperless book, wherein audible information is electronically synthesized words of the printed book which are synthesized in synchrony with the words electronically displayed on the visual display, wherein the visible information may be read under constantly changing conditions when the conditions favor visible reading, and the audible information may be listened to under constantly changing conditions when the conditions favor listening to audible information.

5. The paperless book of claim 4 further comprising a alternating current to direct current converter which plugs into the power jack and provides direct power to the paperless book.

6. The paperless book of claim 4 further comprising a digital storage device for visual and audible information, the digital storage device inserted in the ROM loading door in operation.

* * * * *